United States Patent [19]

Miller

[11] 4,022,918

[45] May 10, 1977

[54] METHOD FOR PRODUCING IRREGULARLY SHAPED EXPANDED FOOD PRODUCTS

[75] Inventor: Robert C. Miller, Ringwood, N.J.

[73] Assignee: Nabisco, Inc., East Hanover, N.J.

[22] Filed: Mar. 31, 1976

[21] Appl. No.: 672,516

Related U.S. Application Data

[60] Continuation of Ser. No. 511,231, Oct. 2, 1974, abandoned, which is a division of Ser. No. 357,799, May 7, 1973, Pat. No. 3,861,844.

[52] U.S. Cl. .............................. 426/446; 426/447; 426/448; 426/497; 426/503
[51] Int. Cl.² ....................................... A21D 13/00
[58] Field of Search .......... 425/197, 198, 202, 206, 425/207, 190, 192, 311, 312; 99/353; 426/445, 446, 447, 448, 449, 450, 497, 503

[56] References Cited

UNITED STATES PATENTS

| | | | |
|---|---|---|---|
| 2,295,868 | 9/1942 | Schwebke et al. | 426/448 |
| 2,488,129 | 11/1949 | Lalande | 425/311 X |
| 2,705,927 | 4/1955 | Graves et al. | 425/192 |
| 3,104,975 | 9/1963 | Bowman | 426/448 |
| 3,117,006 | 1/1964 | Wenger | 426/448 |
| 3,476,567 | 11/1969 | Wood et al. | 426/448 |

*Primary Examiner*—S. Leon Bashore
*Assistant Examiner*—Marc L. Caroff
*Attorney, Agent, or Firm*—Gerald Durstewitz

[57] ABSTRACT

A moist cooked dough of an eatable flour or meal or of a mixture of different flours or meals is prepared and extruded under high pressure. The flow path of the dough is continually changed just prior to extrusion so that different portions of the extruded stream expand semi-independently to form an irregularly shaped expanded product closely resembling popcorn. The flow path of the dough is continually changed by a rotating plate positioned in the extruder adjacent to the extrusion orifices. The plate is provided with an annular portion aligned with the orifices which is provided with apertures of varying size and spacing through which the dough flows to the orifices.

3 Claims, 5 Drawing Figures

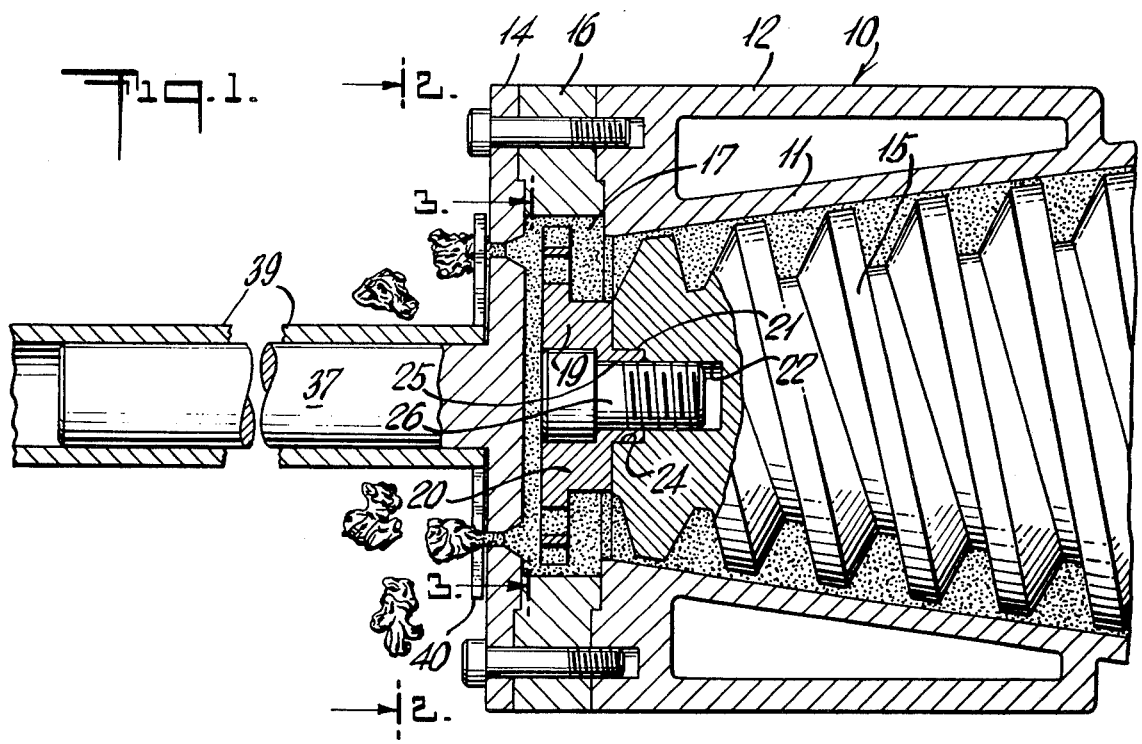
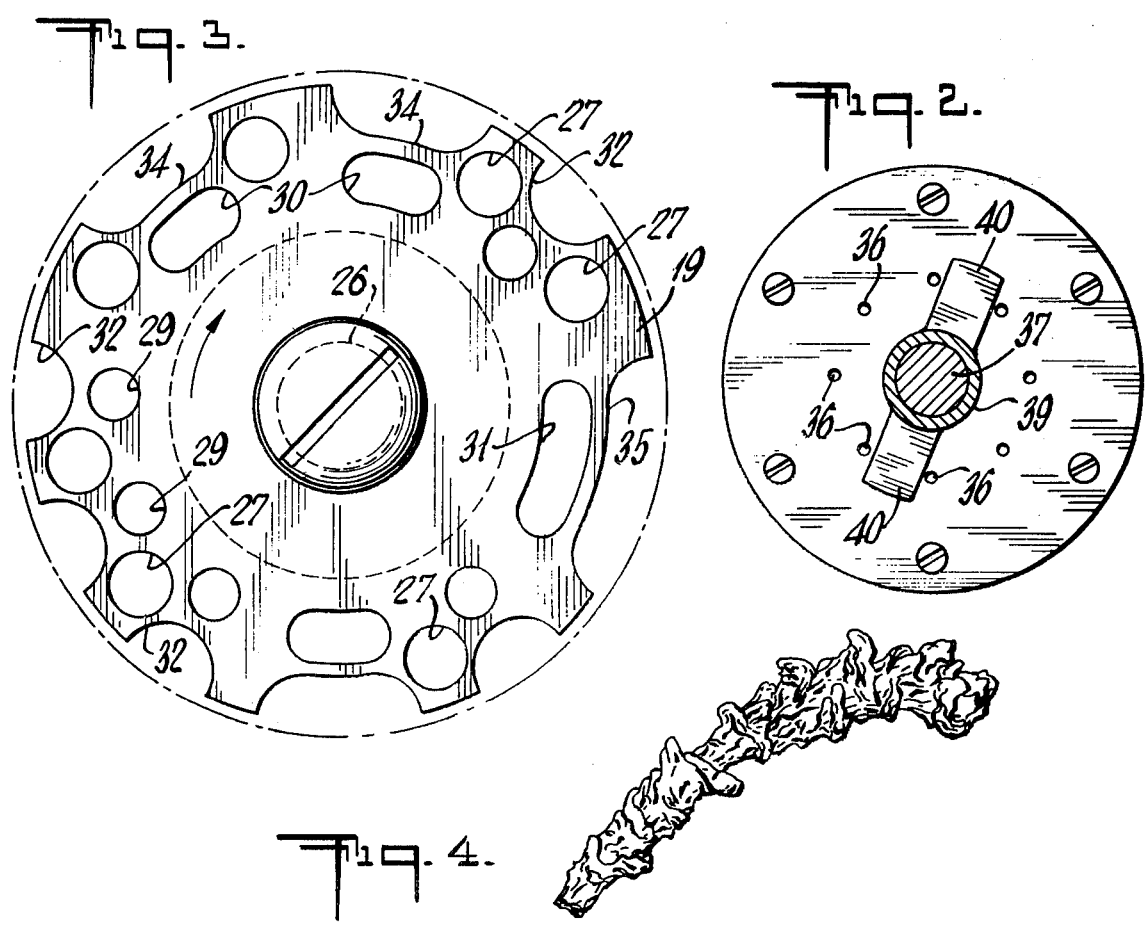

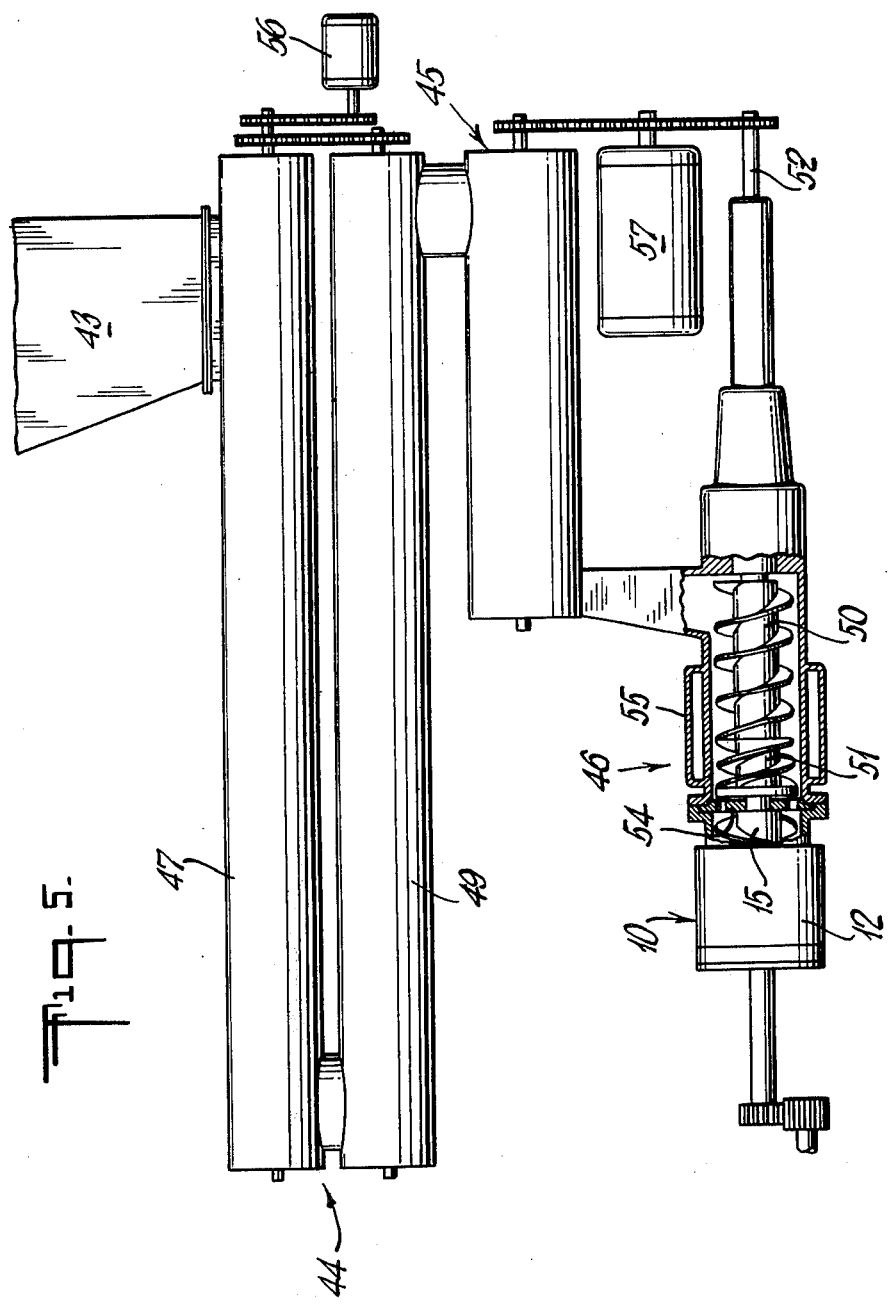

METHOD FOR PRODUCING IRREGULARLY SHAPED EXPANDED FOOD PRODUCTS

This is a continuation of application Ser. No. 511,231, filed 10-2-74, now abandoned; which is a division of Ser. No. 357,799, filed 5-7-73, now U.S. Pat. No. 3,861,844.

BACKGROUND OF THE INVENTION

The present invention relates to the production of puffed food products, and, more particularly, to the production of such products which have irregular shapes.

The oldest and most popular puffed snack product is popcorn which is prepared by heating kernels of popping corn until they explode. The cost and nutritional value of natural popcorn are directly determined by the price and quality of the popping corn which is used. The quality of the corn used also determines the size and texture of the expanded corn pieces and the percentage of the kernels which are successfully converted into expanded product pieces. It is, therefore, difficult to produce a natural popcorn of uniformly high quality and there is no opportunity to reduce its cost. The nutritional value of natural popcorn cannot be readily altered except by additives, which increase cost.

U.S. Pat. No. 3,476,567 describes a process for producing a simulated popcorn product of uniform high quality from cornmeal. In the process, white or yellow cornmeal (or a mixture thereof) having a moisture content between 10 and 12.3% is forced at high velocity of between 950 and 1800 inches per minute, by means of high pressure, through extrusion orifices. The cornmeal is discharged from the orifices in rods which resemble branches with numerous irregularly shaped buds extending from their sides in generally equally spaced clusters. By cutting these rods into small pieces as the rods are extruded, simulated popcorn pieces are formed.

While the process of the patent provides a means of producing corn product pieces which are more uniform in size and quality, it does not provide a way to materially improve the nutritional value of the product. As with natural popcorn, the protein, vitamin, and mineral content of the final product is that of the corn used. Also the potential cost reduction is limited by the fact that cornmeal having a moisture content within the narrow range of 10 to 12.3% must be selected for use in the process. This critical moisture range limits the sources of supply to those of known moisture content (which would tend to be higher in price) or requires that the purchased cornmeal be tested to determine the moisture content. While cornmeal having a lesser moisture content can be used with the addition of water, it is necessary to determine the moisture content of each bath of cornmeal before use, thus increasing costs.

SUMMARY OF THE INVENTION

It is, therefore, an object of the present invention to provide a novel method of producing expanded food products of highly irregular shape from a wide variety of plant materials.

Another object is to provide such a method for producing simulated popcorn.

Another object is to provide novel apparatus for use with a conventional extruder for conveniently practicing the novel method.

The foregoing objects are accomplished by moving a moist cooked dough of granular plant products under high pressure in a stream, continually disrupting the flow pattern within the stream, and suddenly releasing the pressure on the dough at a time such that different portions of the stream expand semi-independently to form an irregularly shaped expanded food product. This method may be practiced with the use of a high pressure extruder within which a flow disrupting device is positioned adjacent to the extrusion orifices.

BRIEF DESCRIPTION OF THE DRAWINGS

A preferred embodiment of the invention has been chosen for purposes of illustration and description, and is shown in the accompanying drawing, forming a part of the specification, wherein:

FIG. 1 is a longitudinal sectional view of the discharge end of an extruder constructed in accordance with the present invention.

FIG. 2 is an end view taken along line 2—2 on FIG. 1 showing the outer surface of the die plate and the rotating knife blade.

FIG. 3 is a sectional view taken along line 3—3 on FIG. 1 showing the configuration of the randomizer or interruptor plate.

FIG. 4 is a view of an uncut extruded strand produced by the method and apparatus of the present invention.

FIG. 5 is a schematic diagram of a high pressure cooker-extruder usable in practicing the present invention.

DESCRIPTION OF THE PREFERRED EMBODIMENT

Referring now to the drawing in detail there is shown in FIG. 1 the head section 10 of a high pressure cooker-extruder of the type disclosed in U.S. Pat. No. 3,117,006 which has been modified according to the present invention. The head 10 includes a conical barrel 11 surrounded by a steam jacket 12, a die plate 14 secured to the end of the barrel 11, and a rotatably driven conical worm or screw 15 positioned within the barrel. In accordance with the present invention, a spacer 16 is positioned between the die plate 14 and the end of the barrel 11 to provide a zone 17 between the end of the worm 15 and the inner surface of the die plate.

Within the zone 17 is positioned a circular randomizer or interrupter-plate 19 provided with a hub 20 and an axially extending flange 21. The end of the worm 16 is provided with an axially oriented threaded bore 22 having an enlarged outer portion 24 for receiving the flange 21. The hub 20 is provided with a countersunk bore 25 and the plate 19 is rigidly secured to the worm 16 by means of a machine screw 26 extending through the bore 25 and threaded into the bore 22.

Referring now to FIG. 3, the annular portion of the plate 19 outwardly of the hub 20 is provided with a plurality of cut out portions including: seven circular holes 27 of the same diameter, five circular holes 29 of a smaller diameter, three short slots 30, one long slot 31, and, at the outer periphery of the plate, four semi-circular cutouts 32, three elongated cutouts 34 of equal length, and one longer cutout 35.

The centers of these cut out portions are non-uniformly spaced along three concentric circles having their center at the axis of the plate 19.

The holes 29 and the slots 30 and 31 are positioned on the inner circle, the holes 27 are positioned on the center circle, and the cutouts 32, 34 and 35 are positioned on the outer circle which coincides with the outer edge of the plate 19.

As shown in FIG. 2, the die plate 14 is provided with eight extrusion orifices 36 equally spaced in a circle of the same diameter as the circle on which the holes 27 are positioned in the plate 19.

The die plate 14 is formed with a central shaft 37 upon which is mounted a rotatable sleeve 39 that is driven by a motor (not shown). A pair of knife blades 40 extend outwardly from the inner end of the sleeve along the face of the die plate 14.

A high pressure cooker extruder of the type referred to herein above disclosed in U.S. Pat. No. 3,117,006 is shown schematically in FIG. 5. This type of extruder includes a hopper 43, a preconditioning unit 44, a blender or mixer unit 45 and an extrusion unit 46.

The preconditioning unit 44 is composed of two steam jacketed screw conveyors 47 and 49 which have inlets through which steam may also be introduced to the interior of the conveyor to moisten the materials being processed.

The blender unit 45 is also steam jacketed and has inlets for the introduction of steam or hot water into the dough being processed. This unit is provided with a multiplicity of paddles extending radially from a driven axial shaft. The motion of the paddles both mixes the dough and moves it axially through the unit.

The extrusion unit 46 has a long first stage screw 50 of uniform pitch throughout, a short second stage screw 51 of considerably shorter pitch, and the conical screw 15. The three screws 50, 51 and 15 are splined to an axial shaft 52. A die plate 54 is positioned between the screws 51 and 15 and the extrusion unit is provided with a steam jacket 55 in addition to the steam jacket 12.

The conveyors 47 and 49 are driven by an electric motor 56, and the blender shaft and the extruder shaft 52 are driven by an electric motor 57.

In the normal operation of this type of cooking extruder, the dry materials are pre-mixed and fed into the hopper while steam is circulated through the steam jacket and introduced into the interior of the conveyors. The dry materials are mixed with the moisture from the steam while being continuously advanced through the conveyors 47 and 49. The temperature of the dough formed is gradually and continuously raised. The moisture content of the dough and its temperature is further increased in the mixer unit 45. The dough is fed into the extrusion unit 46 and is first compressed to a relatively high pressure by the action of the screw 50. The screw 51, being of shorter pitch increases the pressure and the temperature of the dough. The steam jacket 55 aids in further increasing the dough temperature. The dough is forced through the holes in the steam lock die plate 54 and is further pressurized by the conical screw 15. The heating effect the pressure and the steam jacket 12 raise the temperature of the dough well about 100° C.

The material, which is brought to different stages of gelatinization as it moves through the machine is completely gelatinized within the head section 10 prior to extrusion. In the normal operation of this machine, the material is moved in a stable stream to the extrusion orifices by the screw 15 and is extruded in smooth walled strands which expand uniformly upon extrusion to form smooth walled products.

In the present invention, the rotating randomizer plate 19 continually disrupts the flow pattern of the dough as it approaches the die plate. As the plate 19 rotates, it is presenting to the stream of dough a continually changing set of flow paths through and around the plate, and the stream is therefore divided in different ways at different times. It is believed that this action of the plate so disturbs the flow pattern of the dough that the dough streams flowing through the die orifices are each composed of a plurality of flow segments which retain a degree of individual identity (that is, these segments do not fully coalesce into a unified stream) so that, upon extrusion, these segments expand semi-independently to form a highly irregularly shaped product.

As shown in FIG. 4, if the dough is allowed to extrude in a continuous strand, the strand has an irregular gnarled shape which gives the general impression of consisting of a series of irregular cone like sections each growing out of the preceding section. To form simulated popcorn, the strands are severed at close intervals by the cutter blade as shown in FIG. 1. The individual pieces thus formed are very irregular and very closely resemble pieces of popped popcorn.

Realistic simulated popcorn has been formed with a die plate having six orifices each having a diameter of 3/16 inch and a die plate having two orifices each having a diameter of 0.3 inch. The product velocity at the die was about 400 inches per minute and about 500 inches per minute respectively.

This process has been found to successfully produce simulated popcorn from a variety of raw materials including both single grains and mixtures of grains. The single grains succesfully used were rice flour, cornmeal and potato flour. The grain mixtures successfully used included: a mixture of corn, wheat, and oat flours together with sugar and salt; a mixture of corn flour, soy protein isolate, malt flour, sugar and salt which produced a product having a 25% protein content; and a mixture of soy protein isolate, corn flour, rice flour, wheat flour, salt, and malt flour which produced a product having a 37% protein content.

In processing these materials sufficient water is added to bring the moisture content of the dough to about 19%, therefore, any commercially available grains can be used.

It will be seen from the foregoing description that the present invention provides a novel method and apparatus for producing expanded food products of highly irregular shape from a wide variety of plant materials, and particularly, for producing simulated popcorn.

I claim:

1. The method of producing an irregularly shaped expanded food product comprising the steps of:
    a. moving a moist cooked dough of granular plant material under superatmospheric pressure in a stream toward an extrusion die orifice,
    b. continually randomly interrupting the flow of the dough past a plane perpendicular to the stream by providing a continually changing set of flow paths at said plane which are of different sizes at any particular time and change positions with time to divide the stream in different ways at different times to produce a plurality of individual flow segments, said plane being located sufficiently close to said extrusion die orifice so that the dough after moving past said plane does not fully coalesce into a unified stream and reaches the die orifice as a plurality of flow segments retaining a degree of individual identity, c. and moving the stream through the extrusion die to release the pressure on the dough whereby the flow segments expand semi-independently to form an irregularly shaped extrusion strand.

2. The method fo claim 1 including the step of periodically severing the extruded dough strand to produce a plurality of individual popcorn shaped product pieces.

3. The method of claim 1 wherein the moist cooked dough being moved under superatmospheric pressure has a moisture content of about 19%.

* * * * *